United States Patent
Price et al.

(10) Patent No.: US 7,428,647 B2
(45) Date of Patent: Sep. 23, 2008

(54) SYSTEM AND METHOD FOR MANAGING INFORMATION HANDLING SYSTEM DISPLAY RESPONSE TIME

(75) Inventors: Erin L. Price, Pflugerville, TX (US); Eugen Munteanu, Austin, TX (US); Stefan Peana, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 11/250,202

(22) Filed: Oct. 14, 2005

(65) Prior Publication Data

US 2007/0088966 A1   Apr. 19, 2007

(51) Int. Cl.
G06F 1/00 (2006.01)
G06F 1/26 (2006.01)
G09G 3/36 (2006.01)

(52) U.S. Cl. .................. 713/300; 713/320; 713/324; 345/87

(58) Field of Classification Search ................ 713/300, 713/320, 2; 345/87, 89
See application file for complete search history.

(56) References Cited

U.S. PATENT DOCUMENTS

2005/0225522 A1* 10/2005 Wu et al. ........................ 345/87
2005/0237316 A1* 10/2005 Huang et al. .................. 345/204

OTHER PUBLICATIONS http://icpr.snu.ac.kr/resource/wop.pdf/J01/2003/043/R05/J012003043R050858.pdf; Kim et al., "Design of a Response Time Accelerator for an LCD Panel" Nov. 2003, pp. 858-862 (5 pages).
http://www.vastview.com.tw/english/new.asp#20040519095313; "VTI Targets LCD TV Market, Developes Overdrive ICs With Fast Response Time" *Vast View Technology, Inc.*, Mar. 2004 (5 pages).
http://www.elecdesign.com/Articles/Index.cfm?ArticleID=8365 &pg=2; Zajac, Craig "Using LCD Panels for TVs Takes Technology to the Outer Limits" *Electronic Design*, Jul. 19, 2004 (6 pages).
http://www.extremetech.com/article2/0,1558,10085,00.asp; Poor, Alfred "Feed Forward Makes LCDs Faster", *Extreme Tech*, Sep. 24, 2001 (5 pages).
http://www.pcmag.com/article2/0,1759,7689,00.asp; Poor, Alfred "New Technologies" *PC Magazine*, Feb. 26, 2002 (5 pages).
http://www.elecdesign.com/Articles/Index.cfm?ArticleID=8365 &pg=2; Zajac, Craig "Using LCD Panels for TVs Takes Technology to the Outer Limits" *Electronic Design*, Jul. 19, 2004 (6 pages).

* cited by examiner

*Primary Examiner*—Rehana Perveen
*Assistant Examiner*—Stefan Stoynov
(74) *Attorney, Agent, or Firm*—Hamilton & Terrile, LLP; Robert W. Holland

(57) ABSTRACT

Image quality and power management associated with a LCD panel are balanced with selective enabling and disabling of response time compensation to selection of liquid crystal material states. A power manager disables overdrive voltages for response time compensation with one or more predetermined conditions, such as reliance on internal power or display of non-moving graphics, and enables overdrive voltages with other predetermined conditions, such as reliance on external power or display of moving graphics. Selective enabling and disabling of response time compensation for setting liquid crystal material states ensures highest quality video graphics with appropriate images while reducing unnecessary power consumption when high quality video graphics provide less benefit, such as with lower quality images.

17 Claims, 2 Drawing Sheets

SYSTEM AND METHOD FOR MANAGING INFORMATION HANDLING SYSTEM DISPLAY RESPONSE TIME

BACKGROUND OF THE INVENTION

1. Field of the Invention

The present invention relates in general to the field of information handling system display quality and power management, and more particularly to a system and method for managing information handling system display response time.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to present, communicate, print or otherwise process information. For instance, liquid crystal displays (LCDs) have become popular for presenting information from desktop information handling systems. LCDs have reduced size compared with conventional cathode ray tube (CRT) displays, provide enhanced resolutions, and consume reduced power. LCDs operate by passing light through pixels having red, green and blue filters and liquid crystal material that attenuates the amount of the light provided from each filter by varying between on, off and varying shades of gray. The amount of light from each color filter that is allowed to pass through the liquid crystal material is set by drive voltage signals provided from graphics processing components to the liquid crystal material. Red, green and blue color shades are created with varying amounts of light passed by red, green and blue filters as managed by the amount of light passed by liquid crystal material at each pixel and are combined to present a desired color from the pixel. In a recent improvement to the quality of the image presented by a LCD, response time compensation (RTC) techniques apply an overdriving of the drive voltage to the liquid crystal material for a set period of time in order to achieve a more rapid transition of the material to a desired gray level. The overdrive voltage overshoots the voltage value associated with a desired liquid crystal material state to achieve the state more rapidly and then settles at the normal voltage level associated with the desired liquid crystal state. RTC improves image quality by reducing display motion artifacts, such as shadowing or trailing, when fast moving images are displayed, such as a video image from a DVD. As an example, in one television display, RTC provides increased response time of over 15 ms for transitions from black to white and over 50 ms for transitions from gray to gray.

In addition to their use as external peripheral displays for desktop information handling systems, LCDs are also used as integrated displays in portable information handling systems. Portable information handling systems are typically built with a chassis that houses processing components and a hinged lid that houses the display. Batteries integrated in the chassis provide rechargeable internal power so that the information handling system operates portably without an external power source. A primary challenge in the design of portable information handling systems is reducing the power consumption of the processing components and display so that the system runs on internal power for a sufficient length of time without requiring a recharge of the battery. Thus, portable information handling systems are typically built with components that have reduced power consumption. LCDs that use RTC to provide improved image quality typically are not considered for use in portable information handling systems since the operation of RTC logic at an information handling system typically increases power consumption of the display by 200 mW to 400 mW.

SUMMARY OF THE INVENTION

Therefore a need has arisen for a system and method which provides response time compensation for generating images at a portable information handling system display without undue power consumption.

In accordance with the present invention, a system and method are provided which substantially reduce the disadvantages and problems associated with previous methods and systems for generating images at a display with response time compensation. Response time compensation for images presented at a display is selectively enabled and disabled according to one or more predetermined conditions.

Selective enabling of response time compensation provides high quality moving images and selective disabling or response time compensation provides reduced power consumption.

More specifically, a portable information handling system presents information at an integrated LCD panel on internal or external power. A graphics card or timing controller supports an image engine that generates drive voltages for defining pixel grey levels to display image information. The drive voltages establish pixel liquid crystal material states of white, black or plural shades of gray, which determine the red, blue and green light presented by the color filter. The graphics card also includes an overdrive module that provides overdrive voltages to obtain more rapid liquid crystal material state transitions by overshooting the drive voltage for a temporary time period. A power manager interfaced with image engine and overdrive module selectively enables and disables the use of overdrive voltages according to one or more predetermined conditions. For instance, with the portable information handling system running on internal power, the power manager disables overdrive voltages unless a moving image, such as video, is presented on the LCD panel. In one embodiment, the power manager disables overdrive voltages associated with on and off transitions for liquid crystal material, i.e., white and black transitions, while allowing overdrive voltages for gray-to-gray transitions.

The present invention provides a number of important technical advantages. One example of an important technical advantage is that dynamic enabling and disabling of response time compensation provides an improved user experience.

Enabling of response time compensation during presentation of moving images, such as video, provides high quality images at the expense of greater power consumption, while disabling of response time compensation or enabling underdriving of the panel during presentation of non-moving images reduces power consumption to improve battery charge life of a portable information handling system. For instance, the use of normal drive signals in a typical LCD panel consumes approximately 1000 mW of power while the use of overdrive signals consumes and addition 200 to 400 mW.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selective enabling and disabling of response time compensation or underdrive compensation for a LCD panel of a portable information handling system balances graphics quality and power consumption. Enabling response time compensation provides high quality presentation of moving images and disabling response time compensation provides enhanced battery charge life. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
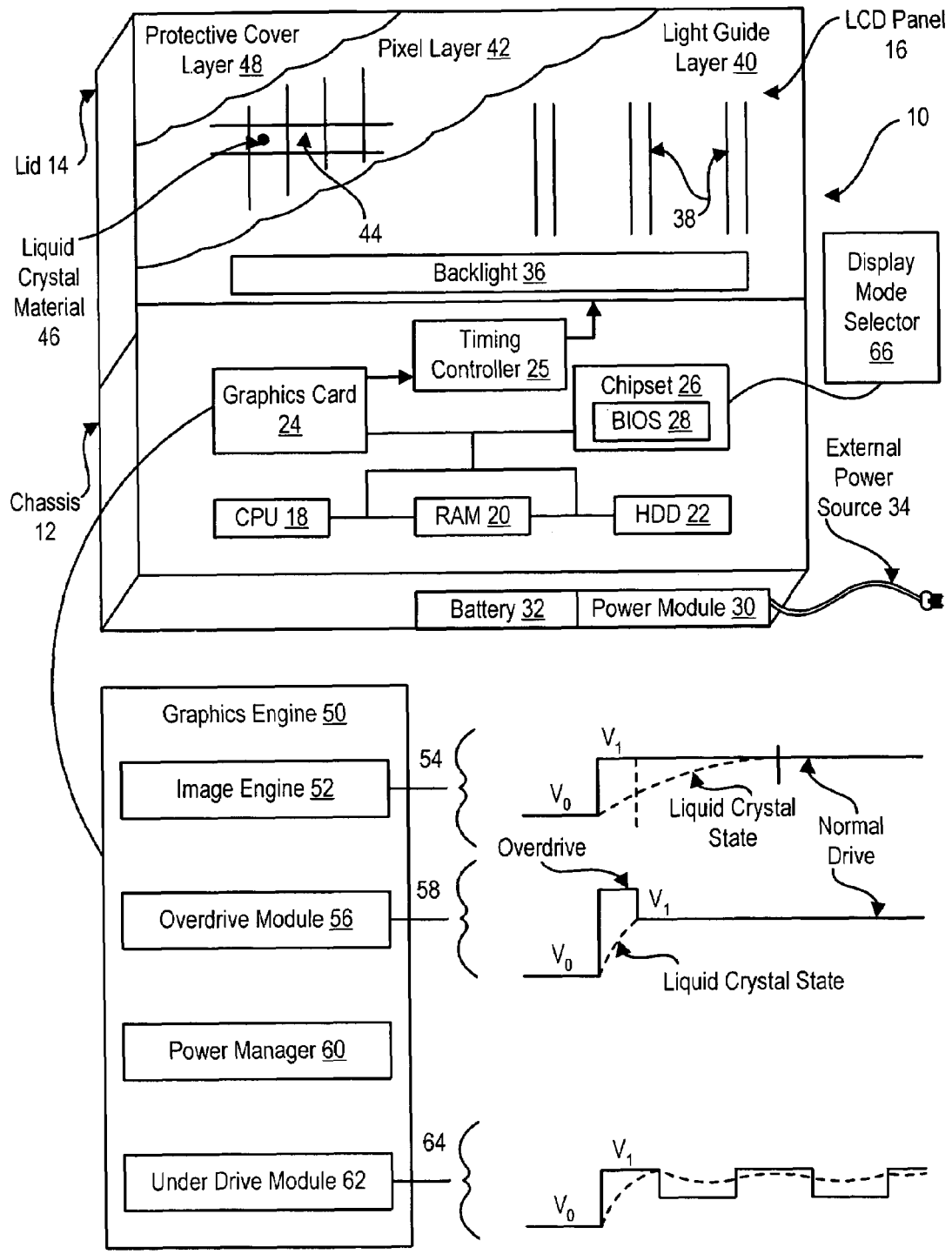
FIG. 1 depicts a functional block diagram of a portable information handling system having selective enabling and disabling of LCD response time compensation.

Referring now to FIG. 1, a functional block diagram depicts a portable information handling system 10 having selective enabling and disabling of LCD response time compensation. Portable information handling system 10 has a chassis 12 hingedly coupled to a lid 14, which contains a LCD panel 16. Chassis 12 contains plural processing components that cooperate to generate image information for display on LCD panel 16, such as a CPU 18, a RAM 20, a hard disk drive 22, a graphics card 24, a timing controller 25 and a chipset 26 having firmware to support a BIOS 28. The processing components and LCD panel are powered by a power module 30 having an internal battery 32 that allows independent operation of the system and an external power source interface 34 that operates the system on external power and charges battery 32.

LCD panel 16 presents image information generated by the processing components and communicated through graphics card 24 and timing controller 25. A backlight 36, such as a CCFL backlight, provides white light to the rear portion of LCD panel 16 which is evenly distributed by light guides 38 in a light guide layer. The white light is illuminated through a pixel layer 42 having plural pixels 44, each pixel having three sub pixels with associated liquid crystal material 46 for managing presentation of red, green and blue light through associated color filters. A clear protective layer 48 contains and protects pixel layer 42 and light guide layer 40. In order to present an image, graphics card 24 through timing controller 25 provides voltages to liquid crystal material 46 to create a liquid crystal state of black, white or a desired of plural intermediate gray shades. By blocking light that passes through the liquid crystal material to different degrees, desired shades of color are illuminated at each pixel to create the image. Most applications provide non-moving images, such as word processing or e-mail pages presented to a user. Some applications provide moving images, such as DVD movies or other video formats.

Graphics card 24 and timing controller 25 include a variety of hardware, firmware and software logic to generate images from information, generally depicted as graphics engine 50. An image engine 52 provides drive voltages to liquid crystal material to achieve a desired state, as is depicted in graph 54. When a drive voltage is applied, the liquid crystal material changes to the desired state over a time period that can exceed the length of time for which the pixel is to display a desired color, thus resulting in poor video quality. An overdrive module 56 compensates for the delay associated with a drive voltage by applying an overdrive voltage, as is depicted in graph 58. The overdrive voltage goes beyond the desired change of material state for a temporary time period and returns to the drive voltage when the desired change of state has occurred, thus achieving the desired material state in a reduced time period. The overdrive voltage provides response time compensation to help ensure that the pixels will reach the desired color in less time, providing a higher quality image, where a displayed image has frequent changes in color across the pixels, such as with a moving image like a video.

Although response time compensation provided by overdrive module 56 improves moving image quality, the processing power used to determine the level of the desired overdrive voltage consumes increased energy compared with the processing power used to determine a normal drive voltage. In order to balance the quality of the presented image with the power consumed, a power manger 60 selectively enables or disables overdrive module 56 according to one or more predetermined conditions, such as conditions set by a user through a display mode selector interface 66. Power manager 60 also selectively engages an underdrive module 62 to apply a power-saving underdrive voltage mode to LCD panel 16. The selection of overdrive, normal and underdrive voltages is performed dynamically, such as by monitoring the type of graphic images that are displayed, or set manually according to a user's preference, such as with manual selection of reduced power modes or high quality display modes by a user. Power manager 60 may reside with graphics engine 50 in graphics card 24 or timing controller 25, depending upon the configuration of the system.

As an example, if information handling system 10 is operating on power from battery 32, power manager 60 disables overdrive module 56 to reduce power consumption. During the power-saving disabling of overdrive module 56, power manager 60 can optionally dynamically enable overdrive module 56 while moving images, such as videos, are detected or while an application is running that presents moving images. Thus, users are provided with high quality video images when warranted but achieve increased battery charge life when lower quality image information is presented, such as word processing or other non-moving images. However, if information handling system 10 is operating on external power, overdrive module 56 may selectively be enabled as desired by a user and independent of the type of image or application since battery charge life is not depleted while running on external power. Alternatively, overdrive voltages associated with specific liquid crystal transitions are disabled, such as on and off transitions for black and white states, while other overdrive voltages are supported, such as gray-to-gray transitions. In the power-savings mode, underdrive module 62 applies an underdrive voltage that periodically reduces from and then returns to the normal drive voltage. The temporary use of reduced voltages saves power while the transition to the normal drive voltage maintains a relatively constant liquid crystal material state.

Figure 2:
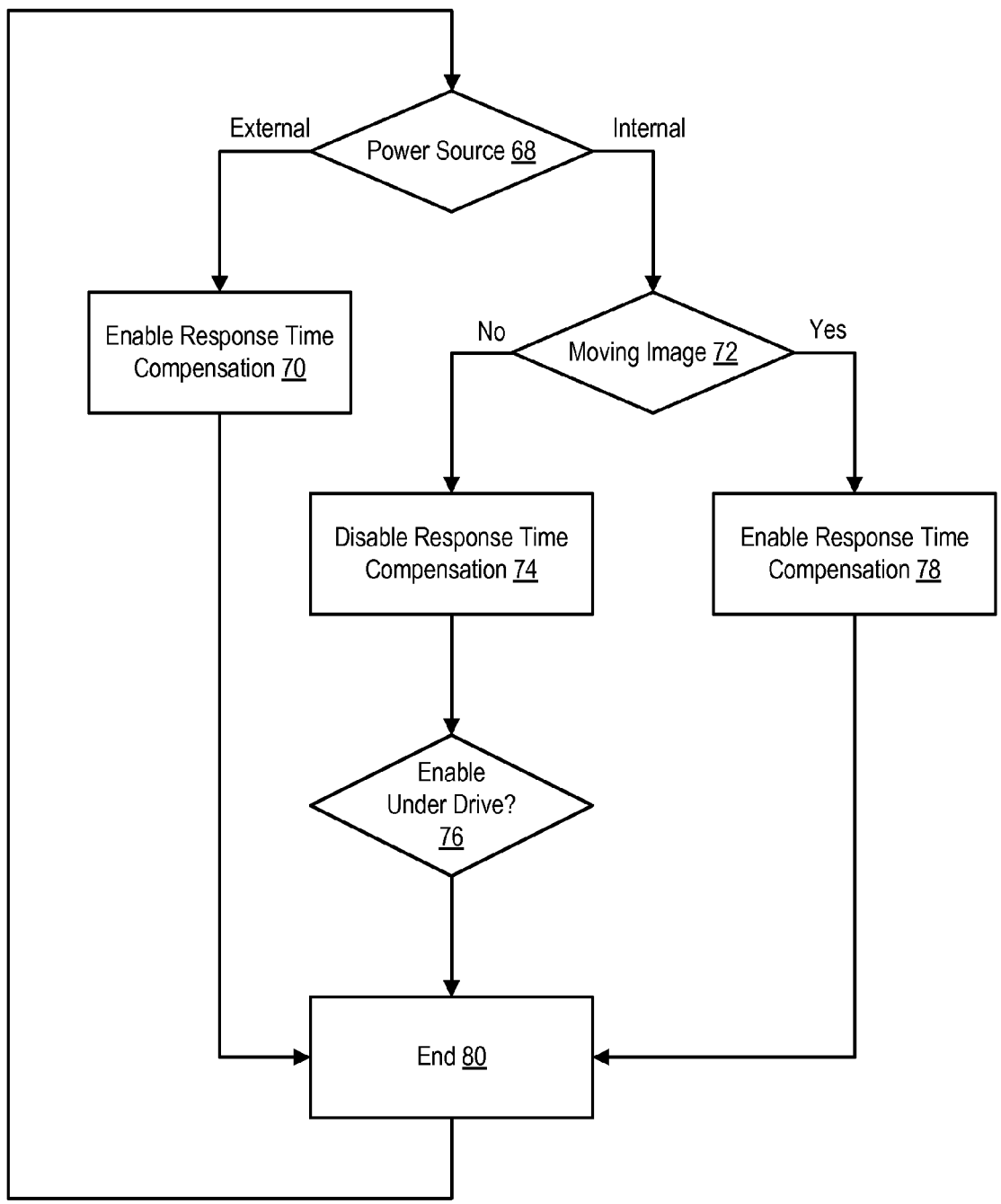
FIG. 2 depicts a flow diagram of one embodiment of selective enabling and disabling of response time compensation in a LCD panel.

Referring now to FIG. 2, a flow diagram depicts one embodiment of selective enabling and disabling of response time compensation in a LCD panel. The process begins at step 68 with a determination of the power source as internal or external. If the power source is external, the process continues to step 70 to enable response time compensation and ends at step 80. If the power source is internal, the process continues to step 72 to determine if the image is moving or non-moving. If the image is non-moving, the process continues to step 74 to disable the response time compensation. At step 76, a determination is made of whether to enter an underdrive mode to further reduce power and the process then ends at step 80. If at step 72 the image is moving, the process continues to step 78 to enable response time compensation and ends at step 80. At step 80, the process periodically returns to step 68 to detect changes in the power source or type of image. In one embodiment, the disabling of response time compensation precludes the use of some but not all overdrive voltages. For instance, transitions between gray shades continue to use response time compensation while transitions to and from white or black do use normal drive voltages. The logic depicted by FIG. 2 is performed in the system BIOS or, alternatively, the graphics card, timing card or other appropriate processing component. User settings may manually override the automated and dynamic changes between overdrive, normal or underdrive modes.

Although the present invention has been described in detail, it should be understood that various changes, substitutions and alterations can be made hereto without departing from the spirit and scope of the invention as defined by the appended claims.

What is claimed is:

1. A portable information handling system comprising:
   a chassis;
   a lid hingedly coupled to the chassis;
   plural processing components disposed in the chassis and operable to process image information;
   a power module disposed in the chassis, the power module operable to power the processing components, the power module selectively receiving power from a battery source disposed in the chassis or an external power source;
   a LCD panel disposed in the lid and interfaced with the processing components, the LCD panel having pixels operable to display images from the image information, the pixels generating the images in response to drive signals having predetermined voltages;
   an overdrive module interfaced with the LCD panel and operable to provide overdrive voltages in place of the predetermined voltages, the overdrive voltages generating the images in less time than the predetermined voltages; and
   a power manager operable to selectively enable and disable the overdrive module based on one or more predetermined conditions.

2. The portable information handling system of claim 1 wherein the predetermined condition comprises the power source, the power manager enabling the overdrive module with the external power source powering the processing components and disabling the overdrive module with the internal power source powering the processing components.

3. The portable information handling system of claim 1 wherein the predetermined condition comprises a determination of the type of image information, the power manager enabling the overdrive module with a determination that the image information comprises video image information.

4. The portable information handling system of claim 1 wherein the predetermined condition comprises a user preference to enable or disable the overdrive module.

5. The portable information handling system of claim 1 further comprising an underdrive module interfaced with the LCD panel and operable to provide underdrive voltages in place of the predetermined voltages, the underdrive voltages generating the images in more time than the predetermined voltages.

6. The portable information handling system of claim 1 wherein the predetermined and overdrive voltages drive black, white and plural gray levels and wherein the power manager selectively disables the overdrive module by disabling overdrive voltages associated with black and white levels.

7. The portable information handling system of claim 1 wherein the processing components comprise a graphics controller and the power manager module comprises firmware running on the graphics controller.

8. The portable information handling system of claim 1 wherein the processing components comprise a BIOS and the power manager module comprises firmware running on the graphics controller.

9. The portable information handling system of claim 1 wherein the processing components comprise a timing controller and the power manager module comprises firmware running on the timing controller.

10. A method for presenting image information from a LCD panel, the method comprising:
    applying overdrive voltages to liquid crystal material of the LCD panel to generate images, the overdrive voltages providing a temporary overshoot of drive voltages associated with desired liquid crystal states;
    detecting transition of the LCD panel from operating on an external power source to operating on an internal power source;
    disabling the applying of the overdrive voltages in response to the detecting; and applying the drive voltages to generate the images.

11. The method of claim 10 further comprising:
    detecting transition of the LCD panel from operating on an internal power source to operating on an external power source; and
    reapplying the overdrive voltages in response to the detecting.

12. A method for presenting image information from a LCD panel, the method comprising:
- applying overdrive voltages to liquid crystal material of the LCD panel to generate images, the overdrive voltages providing a temporary overshoot of drive voltages associated with desired liquid crystal states;
- detecting a predetermined application running on an information handling system integrated with the LCD panel;
- disabling the applying of the overdrive voltages in response to the detecting; and applying the drive voltages to generate the images.

13. A method for presenting image information from a LCD panel, the method comprising:
- applying overdrive voltages to liquid crystal material of the LCD panel to generate images, the overdrive voltages providing a temporary overshoot of drive voltages associated with desired liquid crystal states;
- detecting a manually-input user setting;
- disabling the applying of the overdrive voltages in response to the detecting; and
- applying the drive voltages to generate the images.

14. A system for displaying images on a LCD panel having plural pixels, each pixel have colors determined by liquid crystal material states, the system comprising:
- an image engine operable to receive image information and to generate drive voltages for communication to the LCD panel, the drive voltages having plural levels, each level associated with a liquid crystal material state reached in a response time, the liquid crystal material state associated with a pixel color;
- an overdrive module interfaced with the image engine and operable to generate overdrive voltages, the overdrive voltages temporarily altering the drive voltages to reach the liquid crystal material states in reduced response times;
- a power manager interfaced with the overdrive module, the power manager operable to selectively disable or enable overdrive voltages under one or more predetermined conditions.

15. The system of claim 14 wherein the predetermined condition comprises disabling overdrive voltages for operation of the LCD panel on battery power and enabling the overdrive voltages for operation of the LCD panel on external power.

16. The system of claim 14 wherein the predetermined condition comprises disabling overdrive voltages for display of non-moving images and enabling the overdrive voltages for display of moving images.

17. The system of claim 14 wherein the predetermined condition comprises disabling overdrive voltages for display of information associated with a first application and enabling overdrive voltages for display of information associated with a second application.

* * * * *